July 29, 1969
H. POHL
3,458,738
CLOSED SYSTEM FOR COOLING THE STARTING WINDING OF A
SYNCHRONOUS OR NON-SYNCHRONOUS MACHINE
Filed Aug. 7, 1967
2 Sheets-Sheet 1
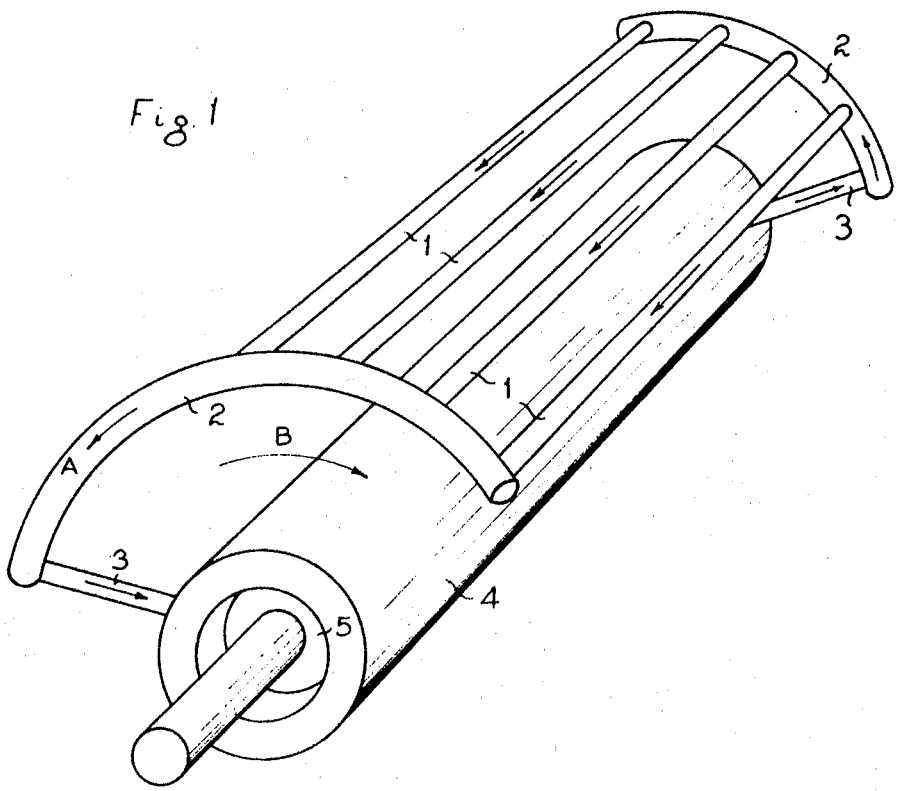
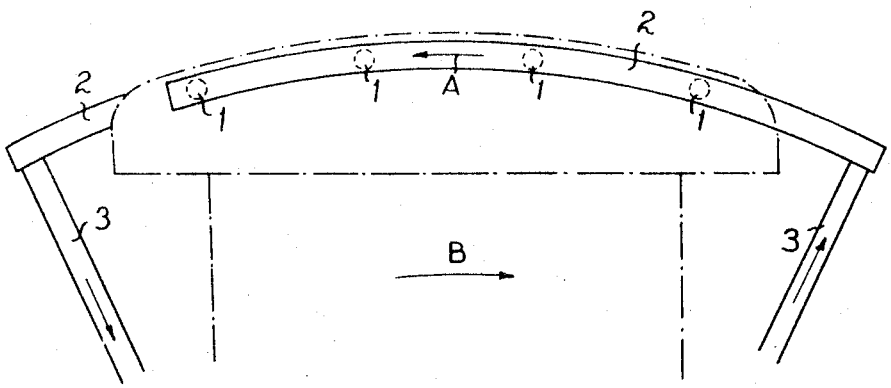
INVENTOR.
Herbert Pohl
BY
Pierce, Scheffler & Parker
Attorneys INVENTOR.
Herbert Pohl

United States Patent Office 3,458,738
Patented July 29, 1969

3,458,738
CLOSED SYSTEM FOR COOLING THE STARTING WINDING OF A SYNCHRONOUS OR NON-SYNCHRONOUS MACHINE
Herbert Pohl, Windisch, Switzerland, assignor to Aktiengesellschaft Brown, Boveri & Cie, Baden, Switzerland, a joint-stock company
Filed Aug. 7, 1967, Ser. No. 658,728
Claims priority, application Switzerland, Aug. 12, 1966, 11,690/66
Int. Cl. H02k 9/20
U.S. Cl. 310—54                                     3 Claims

ABSTRACT OF THE DISCLOSURE

A cooling arrangement for a starting or damper winding on the rotor of an electrical machine wherein the conductors which form the winding are made hollow and establish a closed system for circulation of a liquid coolant. Circulation through the conductors is induced only by angular acceleration of the rotor and consequently the winding is liquid cooled only for the period during which the rotor is being accelerated to its normal constant running speed.

---

Figure 3:
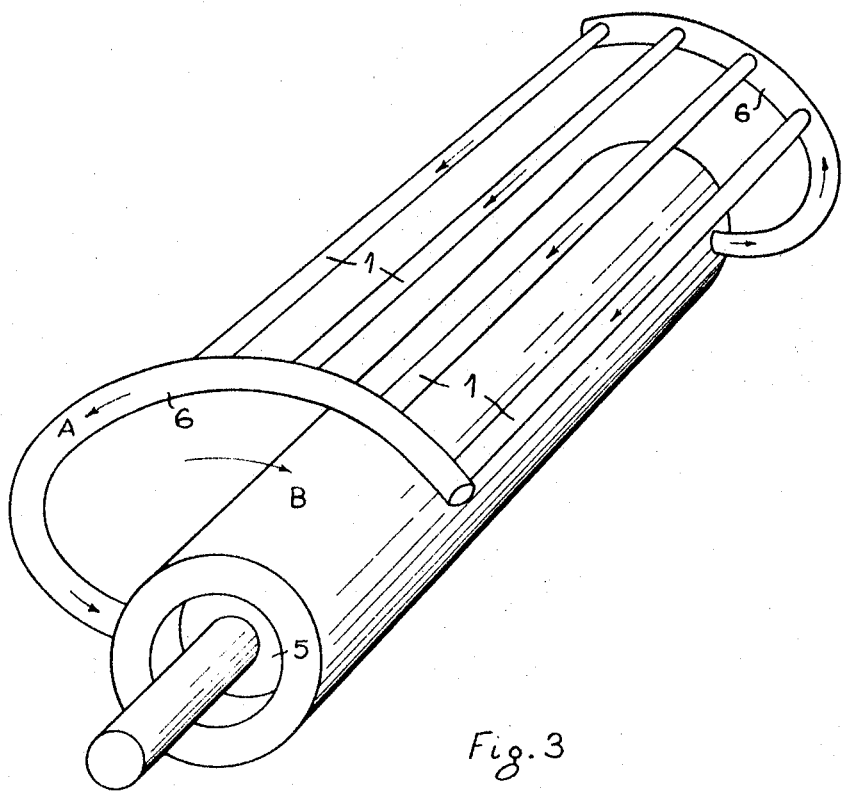

It is known to cool rotating parts of electrical machines, particularly excitation and damping windings, directly with a liquid. A pump outside of the machine is generally provided for circulating the cooling medium, in which case the coolant has to be transmitted from the fixed pump to the winding which is located on the rotating rotor.

For the purpose of directly cooling the rotor of an elcetrical machine it is also known to provide a pump which is arranged on the rotor and thus also rotates, whereby the pump has to be controlled from outside even if a transmitting device for the coolant is no longer necessary.

The object of the present invention is to provide a direct liquid cooling arrangement for the starting winding of a synchronous or non-synchronous machine with a closed circuit for the circulation of the coolant but without having to use a pump. In accordance with the invention this is achieved by arranging the hollow conductors of the starting winding at each end of the rotor in groups which by way of arcuate pipes are in communication with a common axial chamber in the middle of the rotor and form a closed cooling system consisting of several parallel branches, the cooling system being filled with a liquid which is caused to circulate due to the angular acceleration of the rotor when the machine is started.

The invention is now explained by means of two constructional examples shown in the accompanying drawing where FIG. 1 shows the damping winding of a synchronous machine in a schematic view, whilst FIG. 2 shows one of the various parallel branches of the cooling system of the winding to an enlarged scale. FIG. 3 shows a modified embodiment of the invention.

The damping winding, which in the case of a synchronous machine is identical with the starting winding, is formed by the hollow conductors 1 which at both ends of the rotor are in communication with an arcuate pipe 2 that is located in the peripheral direction of the rotor. These arcuate pipes 2 are connected by radial pipes 3 to an axial chamber 5 provided in the rotor core 4 and serving as a reservoir for the coolant. In this way a closed system is formed by the starting winding 1, the arcuate pipes 2, the radial pipes 3, and the chamber 5, this system being filled with a coolant, preferably water. As a result, a closed system consisting of several parallel branches is obtained for cooling the starting winding and this system rotates with the rotor. If desired, it is also possible to provide the arcuate pipes 2 with cooling fins.

As soon as the machine is put into operation and the rotor begins to rotate, the coolant in the arcuate pipes has a direction of flow relative to the rotor which is indicated by the arrow A, this being due to the greater inertia of the water when compared with that of the rotor and the arcuate pipe 2 respectively which have an angular acceleration ($d\omega/dt$.) in the direction indicated by the arrow B.

The heat which passes from the starting winding to the coolant due to the aforementioned circulation of the coolant results in a temperature difference between the water columns in the radial pipes 3, the temperature in the pipes 3 which conduct the water from the arcuate pipes 2 to the chamber 5 being higher than that of the water in those pipes 3 where the water flows in the reverse direction. The water columns with different temperatures also have different specific weights so that a thermo-system effect is produced which is amplified by the centrifugal force and helps the circulation of the water in the direction of the arrow A. The circulation of the water in the closed circuit resulting from the angular acceleration of the rotor only lasts until the machine has reached its full speed; the circulation of the water due to the thermo-syphon effect continues, however, until the rest of the heat due to the starting operation has been carried away from the winding. When this condition has been reached the circulation ceases. The heat energy stored in the cooling water after the starting operation has been completed is then transmitted away during normal operation of the machine by way of the iron core of the rotor to the cooling air.

The arcuate pipes 2 can also be so constructed that they are connected on the one hand to the hollow conductors 1 and on the other hand directly to the hollow chamber 5, in which case only a part of each pipe lies in the peripheral direction. The radial pipes 3 are then omitted. An example of this modified form of the invention is illustrated in FIG. 3 where the arcuate pipes are indicated by 6.

Although the constructional example which has been described, refers to a synchronous machine with salient poles, one of the poles being indicated in FIG. 2 by chain lines, the same cooling medium circuit can be used in a similar manner for the starting winding of a non-synchronous machine.

A number of important advantages are obtained with the cooling system according to the invention. No pumps, valves, and the like are required for cooling the starting winding, it operates entirely automatically, that is to say the circulation of the coolant commences automatically at the right instant and, also ceases automatically when no more energy is produced in the starting winding.

It is known that a starting winding has to be so dimensioned that during the starting operation it can absorb the energy produced in it without becoming overheated. Under certain conditions this can result in such a large cross-sectional area for the conductors of the winding that for mechanical reasons it can no longer be accommodated in a normal pole shoe. With the arrangement described it is possible to increase the heating capacity of the starting winding very considerably without having to increase the cross-section of the conductors; the heating capacity of the cooling water adds itself to that of the winding conductor material.

The admissible temperature rise for the conductor of a starting winding is approximately 250° C. whereby the difference in thermal expansion of the pole shoe and conductor is considerable and often causes damage. The maximum temperature attained by a starting winding which is water-cooled according to the invention is, however, hardly ever above 100° C.

I claim:
1. Closed cooling medium system for directly cooling the starting winding of a synchronous or non-synchronous machine consisting of hollow conductors, characterized in that at each end of the machine rotor the hollow conductors of the starting winding are arranged in groups which by way of arcuate pipes are in communication with a common axial chamber in the middle of the rotor core and form a closed cooling system comprising several parallel branches, said system being filled with a cooling liquid which is put into circulation due to the angular acceleration of the rotor when the machine is started, circulation of the liquid in said closed cooling system resulting from the angular acceleration forces being automatically terminated when said rotor reaches its final constant speed.

2. Closed system as in claim 1, characterised in that at each end of the rotor the hollow conductors of the starting winding are connected in groups to an arcuate pipe located in the circumferential direction of the rotor, said arcuate pipes being connected by radial pipes to an axial chamber in the centre of the rotor core.

3. Closed system as in claim 1, characterised in that at each end of the rotor the hollow conductors of the starting winding are connected to an arcuate pipe which at one end has an extension which is joined to the axial chamber in the centre of the rotor core.

References Cited

UNITED STATES PATENTS

| 3,075,104 | 1/1963 | Willyoung | 310—54 |
| 3,165,655 | 1/1965 | Eis | 310—54 |

FOREIGN PATENTS

| 883,827 | 12/1961 | Great Britain. |

WARREN E. RAY, Primary Examiner

R. SKUDY, Assistant Examiner

U.S. Cl. X.R.

310—64